E. B. SOSA.
SPRING WHEEL.
APPLICATION FILED APR. 4, 1921. RENEWED AUG. 14, 1922.
1,430,414.
Patented Sept. 26, 1922.
2 SHEETS—SHEET 1.
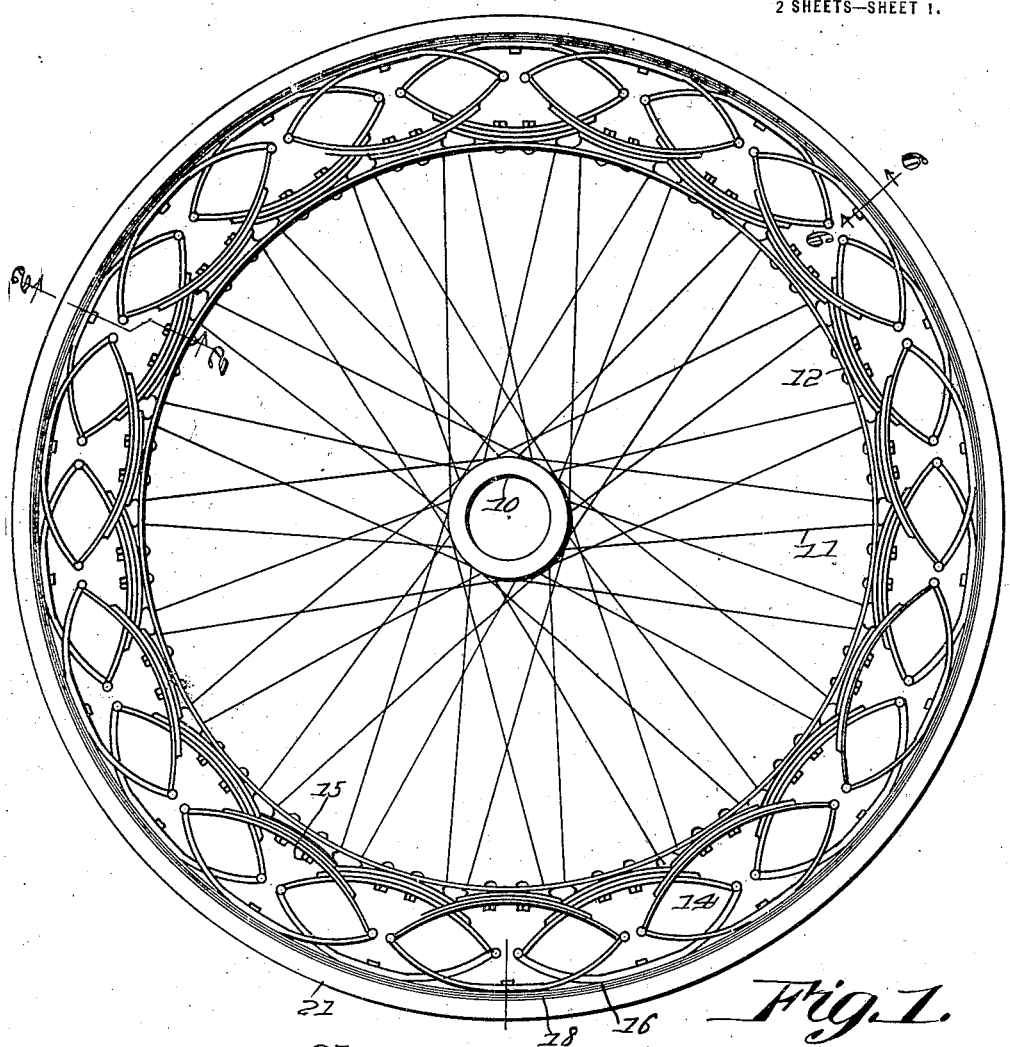
Fig. 1.
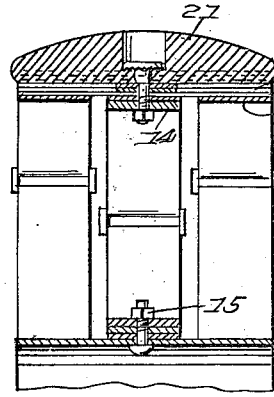
Fig. 2.
Fig. 7.
Inventor
Enrique Brandao Sosa,
By Marks & Clerk
Attorneys

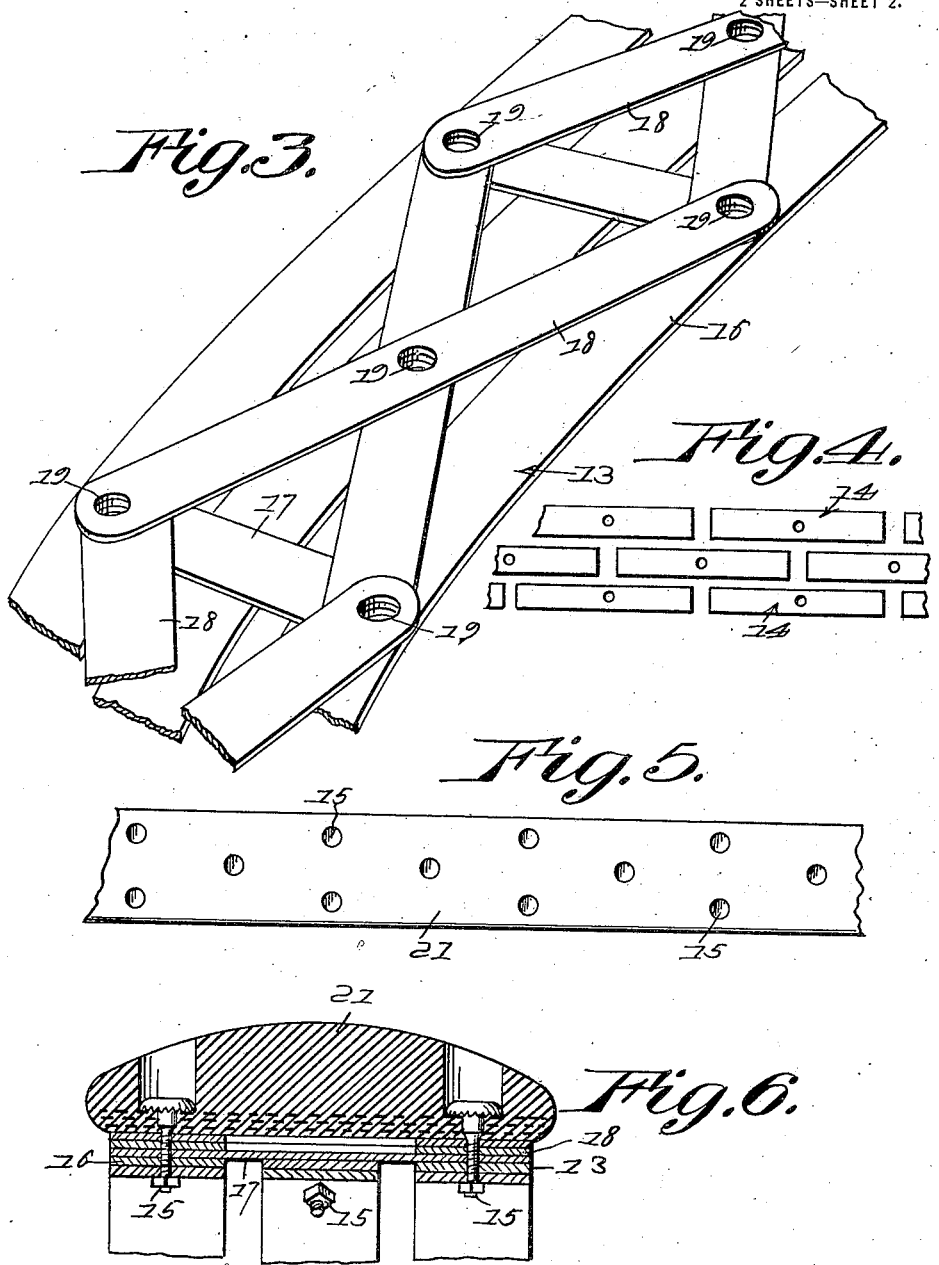

Patented Sept. 26, 1922.

1,430,414

UNITED STATES PATENT OFFICE.

ENRIQUE BRANDAO SOSA, OF MONTEVIDEO, URUGUAY.

SPRING WHEEL.

Application filed April 4, 1921, Serial No. 458,202. Renewed August 14, 1922. Serial No. 581,841.

*To all whom it may concern:*

Be it known that I, ENRIQUE BRANDAO SOSA, citizen of Uruguay, residing at Montevideo, Uruguay, have invented certain new and useful Improvements in Spring Wheels, of which the following is a specification.

This invention has for its object to provide a spring wheel wherein the resilient elements which absorb the shocks incident to travel of the wheel over rough roads and prevent their direct transmission to the wheel hub and axle, are arranged in a plurality of circular series, the resilient elements of one series being staggered or offset with respect to those of the adjacent series so as to dispose the outer rim engaging portions of the resilient elements in close proximity throughout the entire circumference of the rim part to widely and evenly distribute the resilient pressure thereon and consequently permit the utilization of a light rim part possessing a high degree of inherent resiliency equivalent to that of pneumatic tires.

A further object is the provision of a spring wheel possessing such high resilient qualities as to permit the substitution of such inexpensive material as rubber coated fabricated esparto rope, for costly pneumatic tire casings.

A further object of the invention is to provide an outer or tire carrying rim part which is built up in the form of an open frame composed of a plurality of spaced circular and transverse and oblique strips of light and durable construction which is capable of flexure transversely of the wheel tire.

With these and other objects in view, the invention consists of the novel features of construction, combination and arrangement of parts as will be hereinafter more fully described and claimed.

In the accompanying drawings:

Figure 1 is a side elevation of the improved spring wheel.

Fig. 2 is a transverse sectional view through the outer part of the wheel on the line 2—2 of Fig. 1.

Fig. 3 is an enlarged fragmentary perspective of the frame structure constituting the outer rim part.

Fig. 4 is a diagrammatical plan of the springs or resilient elements illustrating their staggered relation.

Fig. 5 is a fragmentary plan view of the wheel tire.

Fig. 6 is a transverse section on the line 6—6 of Fig. 1.

Fig. 7 is a side elevation of a modified type of resilient element.

Referring to the drawing in detail, wherein similar reference characters designate corresponding parts throughout the several views, the numeral 10 indicates a preferred type of hub carrying radiating spokes 11 connected with the felly or inner rim 12 which latter possesses sufficient rigidity to withstand the strain of the load to be imposed thereon without deformation. An outer rim defined generally by the numeral 13 is arranged in concentrically spaced relation to the inner rim 12 and a plurality of resilient elements 14 are interposed therebetween and normally maintain the concentric relation of the inner and outer rims.

The resilient elements 14 are in the form of elliptical springs, the inner portions of which are formed by a plurality of leaves rigidly secured intermediate their ends to the inner rim 12 by bolts or equivalent fastening elements 15 permitting the convenient removal of the springs from the wheel in case of necessity of repair or replacement. The outer portions of the springs may be formed of single leaves as suggested in Fig. 1, or if preferred, may be formed of multiple leaves as suggested in Fig. 7 and these portions of the springs are secured intermediate their ends to the outer rim 13 by additional fastening elements 15.

The cushioning elements 14 are arranged in a plurality of circular series intermediate the inner and outer rims 12 and 13 respectively, and as more clearly shown in Fig. 4, the springs of the respective series are staggered or offset transversely of the space between the inner and outer rims and owing to this arrangement of the springs, the points of contact of the latter with the outer rim 13 are arranged in comparatively close relation throughout the entire outer circumference of the wheel so as to more widely distribute the resilient pressure exerted upon the outer rim and thus increase the resilient quality of the wheel structure.

The outer rim 13 consists of a frame-like structure built up of a series of strips of such size as to lend the requisite strength and resiliency to the rim and composed of spaced circular members 16, transverse strips 17 and crossed connecting strips 18. The circular sections 16 are arranged in the planes of the several circular series of resilient elements 14 and constitute seats or abutments therefor. The transverse strips 17 are arranged in contact with the outer faces of the circular sections 16 and contiguous to the portions of the resilient elements 14 of the two outer circular series and the terminals thereof are apertured to accommodate the fastening elements 15 which are thus utilized in maintaining the parts 16 and 17 of the frame-like rim structure in assembled position. The crossed frame members 18 are also provided with terminal apertures 19 which register with the openings provided in the parts 16 and 17 and also receive the fastening elements 15. The points of intersection or crossing of the pairs of members 18 are disposed in direct radial alinement with the portions of the intermediate circular series of springs 14 which contact with the intermediate circular member 16 and these portions of the crossed members 18 are also apertured to accommodate the fastening elements 15 by which the springs of said intermediate circular series is held in position.

The headed outer extremities of the fastening elements 15 for the outer portions of the resilient elements 14 are countersunk in apertures formed in a tire 21 whereby the latter is rigidly held in position upon the outer rim 13.

A spring wheel constructed in accordance with this invention affords a high degree of resiliency and permits the utilization of a tire constructed of such material as esparto rope covered with rubber to enhance the resiliency and durability thereof.

I claim as my invention:

1. In a spring wheel, inner and outer rims, the outer rim including a plurality of separate annular members and members connecting the annular members, and a plurality of circular series of resilient elements interposed between the respective annular members of the outer rim and the inner rim.

2. In a spring wheel, a substantially rigid inner rim, an outer rim composed of a plurality of resilient circular and transverse connecting members, and resilient means interposed between the rims.

3. In a spring wheel, an inner rim, an outer rim, said outer rim consisting of a plurality of circular members, transverse connecting members and crossed members connecting the transverse connecting members, resilient elements arranged in series and confined between the respective circular members and the inner rim.

4. In a spring wheel, an inner rim, an outer rim composed of a plurality of circular members and transverse and obliquely disposed members connecting the circular members, resilient elements interposed between the inner and outer rims and secured to the inner rim, and means arranged to connect and secure the resilient elements with the circular, transverse and oblique members of the outer rim.

5. In a spring wheel, inner and outer rims, resilient means interposed between the rims, said outer rim being composed of a plurality of resilient circular and transverse connecting members, a tire arranged about the outer rim, and fastening elements extending through and securing the tire, outer rim members and contiguous portions of the resilient means.

6. In a spring wheel, an inner rim, a plurality of circular series of resilient elements arranged about the inner rim, a circular member of resilient material arranged about each circular series of resilient elements, transverse connecting members extending across the outer portions of the circular members, and crossed members connected with the extremities of the transverse members.

In testimony whereof I affix my signature.

ENRIQUE BRANDAO SOSA.